United States Patent [19]

Bir et al.

[11] 3,884,766

[45] May 20, 1975

[54] RECOVERY OF ALKENYL-AROMATIC MONOMERS BY FALLING STRAND DEVOLATILIZATION

[75] Inventors: Wallace G. Bir, Creve Coeur, Mo.; Joseph Novack, Springfield, Mass.

[73] Assignee: Monsanto Company, St. Louis, Mo.

[22] Filed: Mar. 9, 1973

[21] Appl. No.: 339,783

[52] U.S. Cl. .................. 202/173; 203/9; 159/2 MS; 260/43.5
[51] Int. Cl. ............................................. B01d 3/02
[58] Field of Search .............. 203/9, 72, 173; 159/2, 159/48; 260/669 A, 93.5; 202/173

[56] References Cited
UNITED STATES PATENTS

| | | | |
|---|---|---|---|
| 2,813,137 | 11/1957 | Twaddle et al. | 260/93.5 R |
| 3,201,365 | 8/1965 | Charlesworth et al. | 260/93.5 A |
| 3,450,183 | 6/1969 | Hinton | 260/93.5 R |
| 3,719,720 | 3/1973 | Bir et al. | 260/669 A |

*Primary Examiner*—Norman Yudkoff
*Assistant Examiner*—Frank Sever
*Attorney, Agent, or Firm*—Joseph S. Nelson; Edward P. Grattan; James C. Logomasini

[57] ABSTRACT

Disclosed is an apparatus adapted for the continuous on-line recovery of alkenylaromatic monomer from a polymer-monomer melt and for the removal of alkenylaromatic oligomers and high boiling organic compounds from the thus-recovered monomer. The apparatus comprises in combination a two-stage falling strand devolatilization unit, a perforated sieve tray liquid-vapor contacting and separation unit receiving a vapor stream from the first stage of the volatilization unit and a direct liquid contact condensing unit receiving a vapor stream from the second stage of the falling strand devolatilization unit.

8 Claims, 4 Drawing Figures

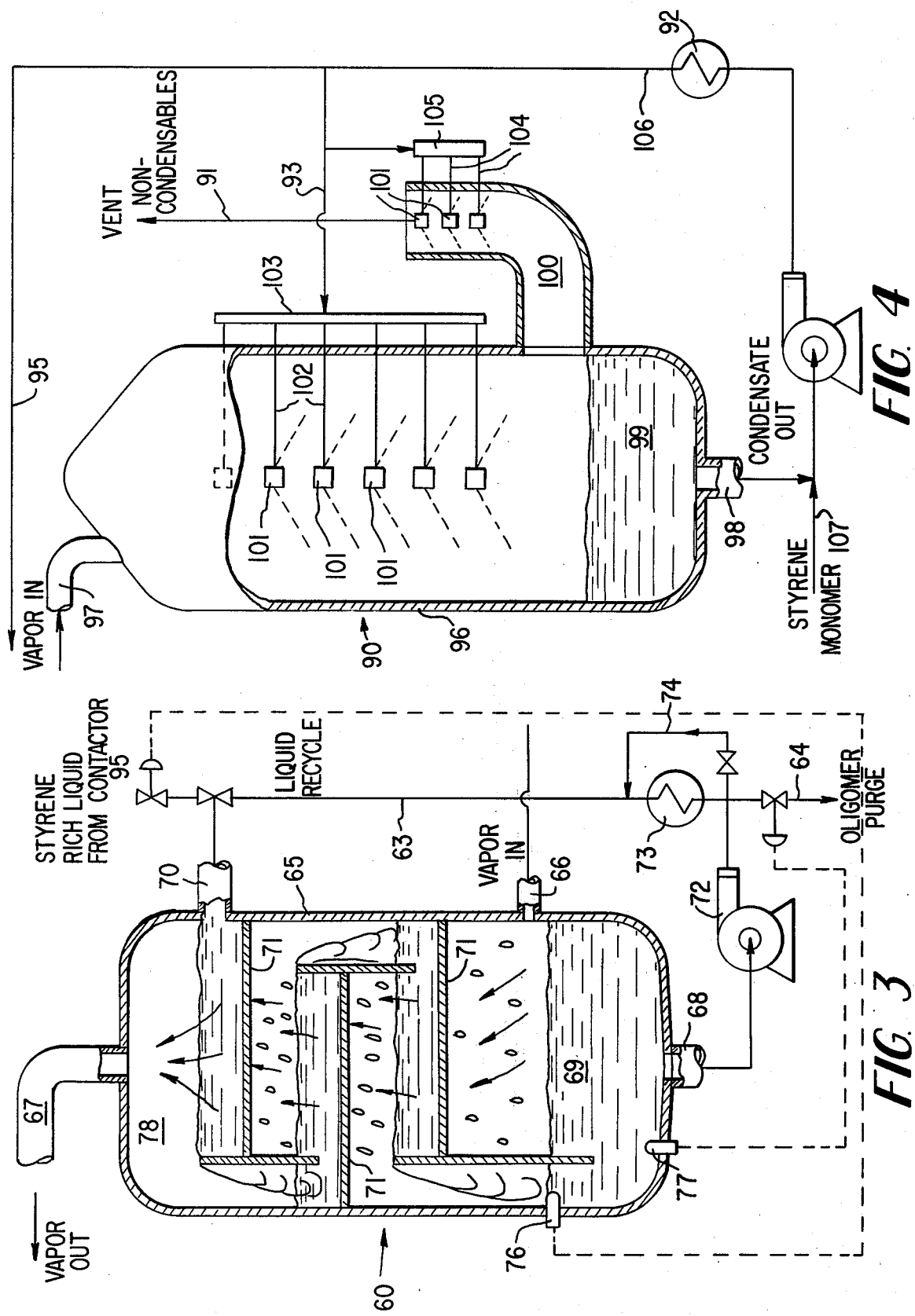

RECOVERY OF ALKENYL-AROMATIC MONOMERS BY FALLING STRAND DEVOLATILIZATION

BACKGROUND OF THE INVENTION

In recent years there has been an increasing interest in the production by continuous mass polymerization techniques of alkenylaromatic polymers, especially homopolystyrene and a rubber modified graft copolymer of styrene polymerized on a pre-formed elastomeric substrate, this latter material known commercially as impact polystryrene. In such mass polymerization techniques, the polymer is first produced by continuous mass polymerization, and thereafter a stream of the polymer dispersed in styrene monomer, and sometimes containing other added polymers, is devolatilized to remove unpolymerized monomer and low boiling volatile materials therefrom. It has also been found in some cases that devolatilization can best be carried out in more than one stage, i.e., with more than one devolatilizer used in series. From the devolatilization apparatus there is emitted a stream or streams containing alkenylaromatic monomer vapor. The quantity of monomer thus emitted in such streams is so significant that recovery procedures are economically a necessity.

Heretofore a variety of alkenylaromatic monomer recovery procedures have been employed. In general, it is possible to condense the monomer and recycle it to the polymerization zone or zones of a continuous process. Typically, however, over a period of time the concentration of lower molecular weight but volatile alkenylaromatic digomers, especially dimers and even trimers, tends to build up in a continuous system, and it is necessary in order to maintain high standard of product quality to control or limit the amount of such oligomers returned from the one or more devolatilization zones to the polymerization zone or zones. In addition, it is necessary with certain of the styrene polymers that particular additives be incorporated therein during polymerization to ensure high product quality. These additives include internal lubricants such as relatively long-chain fatty acids and esters, certain waxes, relatively high boiling hydrocarbons such as mineral oil and also dyes or tints, stabilizers and inhibitors in relatively very small quantities. While many of these additives are non-volatile in nature, the high heat conditions prevailing in the devolatilization procedures results in vaporization of certain of the long-chain fatty acids, esters and waxes as well as the high boiling hydrocarbons such as mineral oil. It is essential, in order to meet quality control, that the level of such additives not be reduced during the devolitalization procedure below a desired and specified quantity.

Another aspect of the overall mass alkenylaromatic polymerization system concerns the removal of oligomer from a styrene monomer stream which has been recovered as pointed out above and is destined for recycling to an on-line polymerization reactor.

Heretofore, removal of oligomer from a monomer stream and subsequent recovery of additives therefrom has been done by off-line distillation. A typical procedure involves the collection of condensate from the devolitalization zone followed by distillation thereof in a fractional distillation column capable of separating the oligomers and additives from the monomers. In general, prior art oligomer and additive separation techniques involve off-line process operations, typically practiced on a continuous basis.

There has now been discovered an apparatus suitable for on-line recovery of monomer, removal of oligomers and recovery of high boiling additives from a stream of alkenylaromatic monomer vapor. The apparatus is relatively simple, it can be conveniently incorporated into conventional continuous polymerization equipment, and it permits one to avoid the necessity for expensive and time consuming off-line separation procedures. It also affords broad flexibility in controlling the amounts of separated oligomers and high boiling additives which can be recycled to the reaction zones of the process, as well as the amounts thereof purged to maintain selected levels in continuous operations.

SUMMARY OF THE INVENTION

The present invention is directed to an apparatus suitable for recovering alkenylaromatic monomer from a stream containing said monomer together with alkenylaromatic polymer, oligomers, high boiling organic compounds and inert hydrocarbons, and for reducing the concentration of oligomers and high boiling compounds in a thus-recovered super-heated vapor feed stream composed of alkenylaromatic monomer, sometimes an organic solvent, alkenylaromatic oligomers, high boiling organic compounds, i.e., additives and high boiling impurities inn alkenylaromatic monomer feeds, and miscellaneous inert hydrocarbons, typically low boiling, normally present additionally as low level impurities in commercial grade alkenylaromatic monomer.

In accordance with the present invention, there is provided a novel combination of apparatus components, one of which is a two-stage falling strand devolatilizing apparatus suitable for devolatilizing an alkenylaromatic polymer-monomer melt consisting primarily of styrene polymer and styrene monomer, but including also minor amounts of oligomer, high boiling organic compounds and inert hydrocarbon components. The devolatilizing apparatus consists of a means for heating the said polymer-monomer melt, this means typically being a tube in shell heat exchanging apparatus. The heating means is placed directly over first and second flash vaporization chambers which are likewise positioned respectively in contiguous descending vertical relationship and are in communication with one another via a connecting pipe or the like. Also provided in connection with the falling strand devolatilizing apparatus are means for producing a vacuum within each of said flash vaporization chambers and means for maintaining an elevated temperature in each of the chambers.

As a second piece of equipment in the combination there is provided a first contacting and separation apparatus for bringing into direct and intimate contact a vapor stream originating from the first flash vaporization chamber of the volatilizing apparatus and a liquid stream. This apparatus also contains a means for separating the vapor stream from the liquid stream after contacting has been completed. In the preferred embodiment of the present invention, this first contacting and separation means consists of an enclosed vessel having a plurality of perforated sieve trays carrying the liquid stream and permitting direct and intimate contact with the vapor stream which is conducted so as to pass upwardly through the perforations in the trays and thus also through the liquid stream carried thereby. Most preferably, the subject contacting and separation apparatus is of the type consisting of a vessel having a vapor stream inlet near its lower end, a vapor stream outlet near its upper end, a liquid stream inlet near its upper end, a liquid stream outlet near its lower end, and a plurality of such perforated sieve trays positioned within the vessel in a manner permitting the liquid stream to successively traverse each tray in descending order as the liquid stream flows from the aforementioned inlet means to its outlet means. By means of appropriate arrangement of the trays and the associated wier-forming plates, the apparatus is designed so that the vapor stream, as it passes from its inlet near the lower end of the device to its outlet near the upper end, is forced to pass through the perforations in the tray and thereby intimately contact the liquid stream carried by the trays. There is also provided a recycle loop to recirculate exteriorally of the vessel the liquid stream from its outlet at the bottom of the device back to the inlet position near the upper end of the apparatus. This recycle loop may also be provided with a refrigeration means in combination with a parallel bypass loop, whereupon by the selection of a proper 3-way valve it is possible to selectively permit complete or partial bypass of the refrigeration means.

As the third apparatus in the combination of the present invention, there is provided a second contacting means for bringing a vapor stream exiting from the second flash vaporization chamber of the devolatilizing apparatus into direct and intimate contact with a cooled liquid stream so that substantially all of the vapor stream is condensed. In the preferred embodiment, this second contacting means comprises an enclosed vessel having a vapor stream inlet near its upper end, a vapor stream outlet near its lower end, a liquid stream outlet near its lower end, a plurality of spraying head members positioned in vertically spaced relationship within the vessel in such a manner to assure intimate contact of a cooled liquid sprayed from the heads with the vapor stream as it passes from its inlet port to its outlet port. Preferably, as the means to supply a cooled liquid to the spraying heads, there is provided a collection means at the lower end of the contactor vessel for collecting the cooled liquid stream in combination with the condensed vapor stream plus a recycle loop for exteriorly recirculating at least a portion of the cooled liquid stream and condensed vapor stream to supply the spraying heads as aforesaid. The recycle loop of this second contacting apparatus also contains a refrigeration unit. In one design of the second contacting apparatus, the above-mentioned vapor stream outlet consists of an L-shaped conduit member containing in its upstanding leg portion at least one spraying head to permit a final contacting step between the cooled liquid stream and the vapor stream exiting from the contacting apparatus.

It is also envisaged to provide the necessary connecting conduits between the various pieces of apparatus, as for example, a vapor transmitting conduit between the first flash vaporization chamber and the first contacting and separation means and between the second flash vaporization chamber and the second contacting means, and preferably, a liquid transmitting conduit between the refrigerated recycle loop of the second contacting means and the supply of contacting liquid in the first contacting and separation apparatus.

BRIEF DESCRIPTION OF THE DRAWINGS

The present invention is better understood by reference to the appended drawings wherein:

FIG. 3 illustrataes an apparatus configuration for a contacting and separation unit adapted for use in the purification of separated alkenylaromatic monomer in the present invention; and FIG. 4 illustrates an apparatus configuration for a second contacting unit adapted for use in the separation and recovery of alkenylaromatic monomer in the present invention.

DETAILED DESCRIPTION OF THE INVENTION

Figure 1:
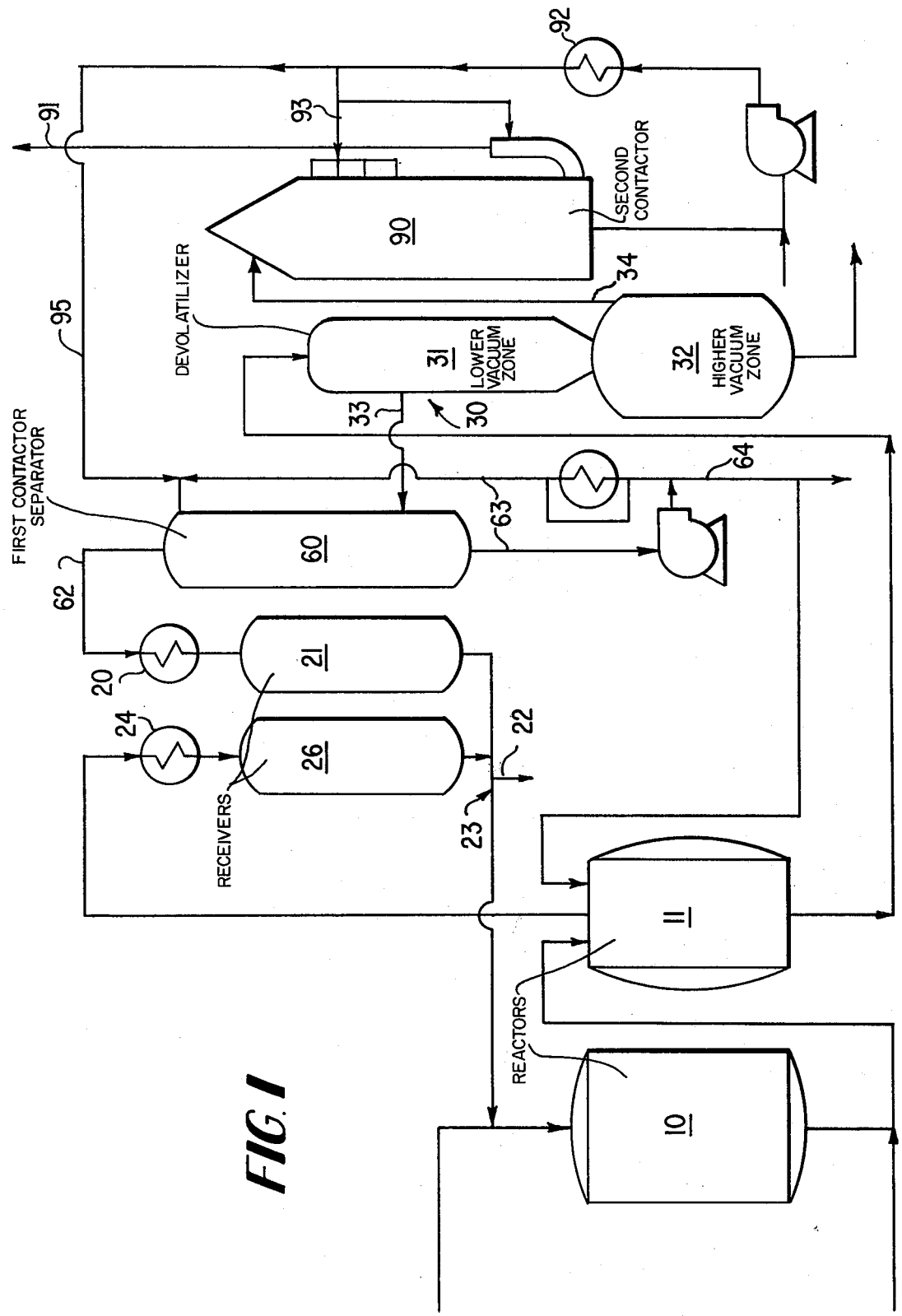
FIG. 1 is a schematic and diagrammatic flow diagram illustrating how the monomer recovery and purification unit of the present invention is incorporated into a continuous alkenylaromatic polymerization process.

The present invention relates to the on-line recovery of alkenylaromatic monomers by separation of same from compositions consisting primarily of alkenylaromatic high polymers in combination with such monomers, and to the purification of the thus recovered monomers to eliminate therefrom undesirable oligomers and high boiling organic compounds. In contradistinction to the customary off-line techniques heretofore employed to accomplish the foregoing results, it is possible in accordance with the present invention to satisfactorily recover and purify alkenylaromatic monomer in a completely on-line system adapted for continuous operation. The significant advantages resulting from employment of the present inventive technique include the elimination of undesirable hold-up times associated with off-line procedures, as well as the flexibility offered by virtue of the continuous nature of the technique thereby permitting accommodation of a wide variety of product formulations. Specifically, the amount and chemical makeup of recycle streams can be conveniently monitored and altered by purging selected amounts of either high boiler-rich or low boiler-rich fractions which result in accordance with the present invention. Likewise, the technique of the present invention permits accomodation of practically any of the wide variety of additives which are conventionally incorporated into alkenylaromatic polymers to achieve particular desired product formulations, and loss of such additives is practically prevented in accordance with the present invention.

The term "alkenylaromatic monomer" as employed in the present application is intended to encompass both styrene itself as well as the conventionally utilized derivatives thereof including the alkyl substituted styrenes such as alpha-methyl styrene, and the halogenated styrenes such as para-bromo styrene, para-dichloro styrene, and the like. Similarly, by the term "alkenylaromatic polymer," it is intended to include those materials resulting from polymerization of the aforementioned monomers, including homopolymers and copolymers of same in addition to graft copolymers produced by polymerization of one or more of said monomers in the presence of a preformed polymeric material, such as a diene polymer. The detailed description of the present invention, however, will be set forth with reference to the polymerization of styrene, the most conventionally employed alkenylaromatic monomer, with the intention that the same will be deemed illustrative of the entire class of alkenylaromatic compounds.

The present invention will also be described with reference to certain additives and impurities which may be present in the various styrene monomer, styrene polymer and mixed monomer and polymer streams throughout the polymerization, recovery and purification systems. In the class of additives are included internal lubricants such as relatively long-chain fatty acids and esters, certain waxes, relatively high boiling hydrocarbons such as mineral oil and also dyes or tints, stabilizers and inhibitors in relatively small amounts. It is the members of this class of materials which generally makes up the "high-boiler" portion of any stream. In addition, however, the terms "high-boiler", "higher boiling fraction" and "fraction of low volatility" are used interchangably throughout the present application to include higher boiling organic impurities which are present, albeit in small amounts, in any styrene feedstock. Similarly, there is present in most commercial styrene feedstocks certain lower boiling inert hydrocarbon impurities in trace amounts such as ethylbenzene, cumene and the like. Constituents of this type generally make up the class of materials known as "low-boilers." Furthermore, while reference is made throughout to the presence of the foregoing constituents, it is to be understood that the principles of the present invention are still applicable where one or more of these additional components is absent.

Referring now to the drawings, in FIG. 1 there is illustrated the general configuration of the recovery and purification unit in accordance with the present invention as well as its incorporation into a continuous mass polymerization process for polystyrene. The recovery and purification unit is made up of the combination of a two-stage falling strand devolatilization unit 30 for separation of styrene monomer and other volatile components from the product styrene polymer stream, a first contacting and separation chamber 60 for purification of a first styrene monomer vapor stream from the devolatilizer 30 by removing styrene oligomer and any high boiling components from said vapor stream, and a second contacting unit 90 which serves to recover all styrene monomer further vaporized in the second stage of the devolatilization unit 30. Each of these three basic individual units will be described in detail hereinafter.

In the general overall process illustrated in FIG. 1, styrene monomer is mass polymerized continuously in a reactor portion of the system, preferably by means of a combination of two reactors 10 and 11 connected in series as illustrated in the drawing, to a conversion of from about 60 to 90 percent, as desired. A melt comprising the product polymer dispersed and dissolved in the unpolymerized monomer is conveyed from the second reactor 11 to the two-stage falling strand devolatilizer 30 wherein substantially all of the monomer is removed except for a residual amount which is less than 1 percent and typically less than about 0.2 percent.

From the first stage 31 of devolatilizer 30, a vapor stream 33 is withdrawn and fed to the contacting and separation device 60 wherein the vapor stream is contacted with a liquid of appropriate composition to remove substantially all of the styrene oligomer and high boiling component of the vapor stream. After separation from such liquid, the vapor stream exits from device 60 and passes through a pipe 62 to a condensing unit 20. the liquified condensate passes from the condenser 20 into a receiver 21, from whence it is pumped and recycled back to reactor 10.

A second vapor stream 34 is withdrawn from the second stage 32 of the devolatilizer 30 and is fed to the second contacting device 90 wherein it is directly and intimately contacted with a stream of refrigerated liquid, thereby effecting condensation of substantially the entire vapor stream, save for a trace amount of styrene monomer and other non-condensable materials which are subsequently vented via line 91. The liquid condensate from contactor 90 is withdrawn and recycled through a refrigerating unit 92, with a portion thereof subsequently being recycled back into the contacting unit 90 via line 93 to provide the aforementioned refrigerated condensing liquid and with a second portion thereof being conducting via line 95 to the first contacting and separation unit 60 where it is added to the supply of contacting liquid employed therein. This contacting liquid in unit 60, which becomes increasingly concentrated with styrene oligomer and high boilers, is continuously withdrawn at the bottom of the unit and is recycled for reintroduction into the upper portion thereof. In this recycle loop 63 there is provided an exit line 64 through which a portion of the contacting liquid may be selectively purged or recycled back to reactor 11, or both concurrently. A purge 22 for low boiling components is provided in recycle line 23 carrying condensed styrene vapors to reactor 10 from contacting and separation unit 60 and the second reactor 11 via condenser 20 and receiver 21 and condenser 24 and receiver 26, respectively.

Figure 2:
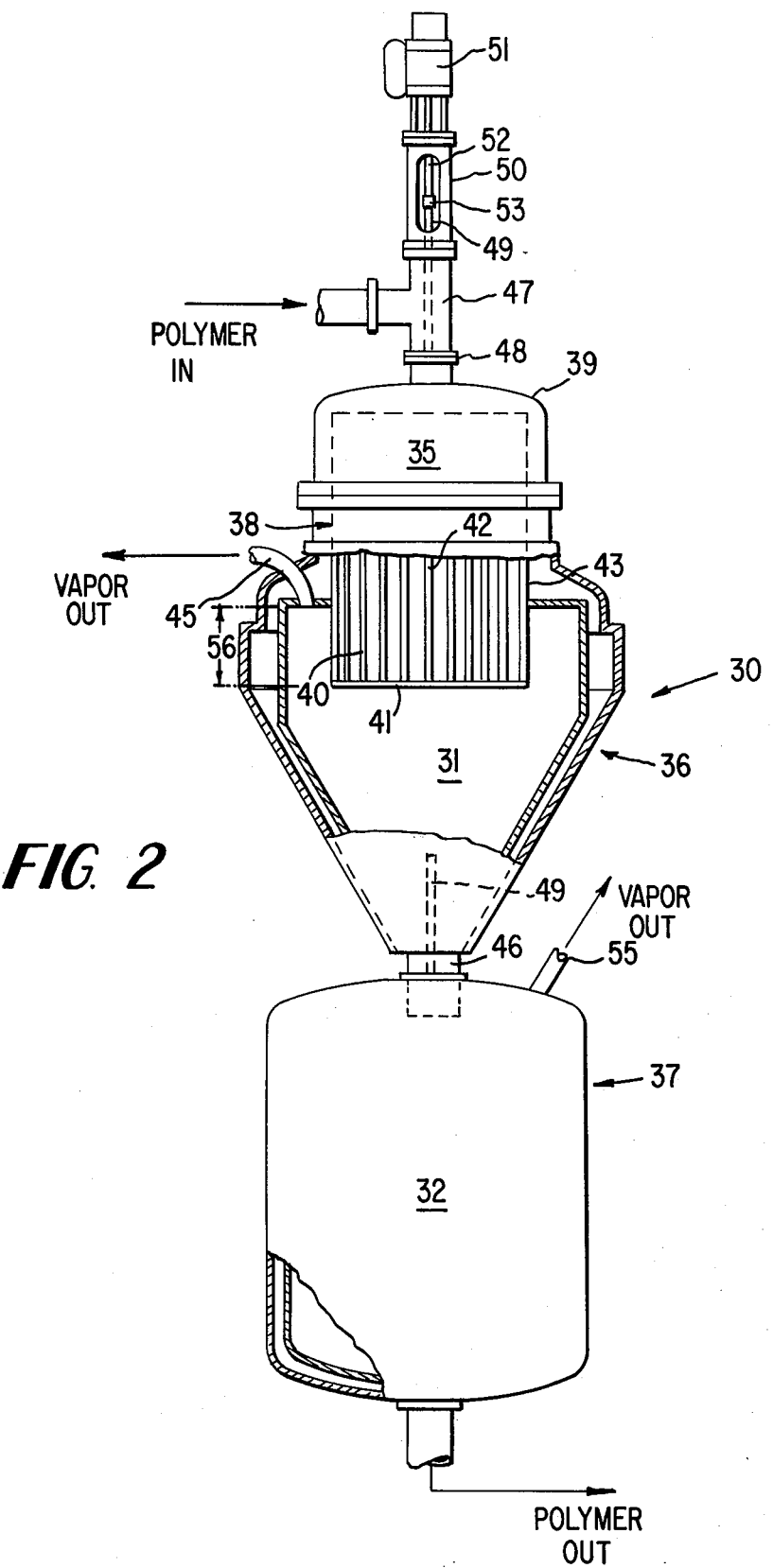
FIG. 2 illustrates an apparatus configuration for a falling strand devolatilization unit adapted for use in the separation of alkenylaromatic monomer in accordance with the present invention.

Turning now to FIG. 2, there is seen illustrated one embodiment of a falling strand devolatilizer suitable for the practice of the present invention, such devolatilizer being designated in its entirety by the reference numeral 30. Falling strand devolatilizer 30 can be considered to be composed of a shell and tube heat exchanger assembly herein designated by the numeral 35, a first flash tank 36 and a second flash tank 37.

The heat exchanger assembly 35 is comprised of a shell and tube exchanger body section 38 in a bonnet or header section 39. Within the body section 38 are mounted a plurality of spaced, parallel tubes composed of steel or the like. Tubes 40 extend between and are mounted into at their respective opposite end regions a pair of plates 41, as by welding or the like, the plates, as are all other elements in this heat exchanger, being typically composed of steel or the like. Spacing between the plates and rigidity for the entire assembly of plates 41 and tubes 40 is augmented by tie rods 42. Tubes 40 are thus placed in sealing engagement with plates 41. Tubes 40 are circumferentially encased by a shell or wall 43, thereby to provide a generally sealed interior region between tubes 40 and the interior wall of shell 43 for circulation of heat transfer fluid.

The first and second flash tanks 31 and 32 of devolatilizer 30 are of double walled jacketed construction for the purpose of controlling the interior temperature of the tanks during operation of the devolatilizer. A vapor take-off port is provided by the pipe and flange assembly 45 which communicates with the interior space of the tank 31 and a second vapor take-off port is provided in the second flash tank by means of pipe 55. The second flash tank 32 communicates with the first flash tank 31 by means of the interconnecting pipe 46. The shell and tube assembly 35 is mounted atop and protrudes into the flash tank 31. Hot melt to be devolatilized is conveniently input into bonnet 39 via pipe and flange assembly 47 which interconnects with the pipe and flange assembly 48. Pipe and flange assembly 47 interconnects with a melt pump (not shown) which is adapted to input into the heat exchanger assembly 35 an appropriate composition to be devolatilized.

In order to control the movement of material from the bottom regions of the flash tank 31 into the second flash tank 32 through the pipe 46, the falling strand devolatilizer has conveniently mounted across and within pipe 46 a plug type valve assembly (details of the plug not being shown) which is adapted to regulate the rate of egress of fluid material from the bottom of flash tank 31 into tank 32. Such a valve assembly includes a long-stem 49 which extends upwardly through the flash tank 31 and through an appropriate channel axially located in the heat exchanger assembly 35, axially through the pipe and flange assembly 47 to project into a pedestal 50, there being an appropriate sealing means about the valve stem 49 in the upper region of the pipe and flange assembly 47. An actuator assembly 51 on the top side of pedestal 50 has a shaft 52 which engages the upper end of the stem 49 by means of a collar 53. The actuator 51 is responsive to a level senser assembly (not shown) adapted to measure fluid level in the bottom region of tank 31. A controller assembly (not shown) couples the level senser with the actuator assembly 51 to complete the remote control of a power-actuated valve assembly in the base of the tank 31.

In operation, the heated composition to be devolatilized enters the tank 31 from the bottom of exchanger assembly 35 and the monomer vapor is promptly flashed away from the polymer melt. The vapor is taken off through pipe and flange assembly 45 in the top of tank 31. The annular area 56 defined within vessel 31 by the inner walls thereof and the adjoining wall of heat exchanger assembly 35 acts as a manifold-like device to collect the vapor and direct it out pipe and flange assembly 45. By having the heat exchanger assembly 35 recessed in the upper region of the tank 31, the tendency of polymer to be thrown within the tank 31 radially sidewardly and hence into the mouth of the pipe and flange assembly 45 is avoided. The once-devolatilized material is then permitted to pass from the first flash tank 31 into the second flash tank 32 immediately therebeneath by means of gravity flow. Because the second flash tank 32 is at a lower pressure than the first flash tank, any residual monomer contained in the polymer melt is flashed away in the second stage and withdrawn by means of pipe 55.

The polymer melt material introduced into the falling strand devolatilizer of the present invention typically contains from about 60 to 90 weight per cent styrene polymer, 10 to 40 weight per cent styrene monomer and minor amounts of the aforementioned additives and impurities. It is fed to the preheater at temperatures from about 140° and 240°C. and exits therefrom at a temperature within the range of about 200° to 280°C. The pressure at which the first flash tank 31 is held ranges from about 50 to 200 mms. of HgA., whereas the pressure of the second flash tank 32 typically is held within the range of from about 3 to 20 mms. of HgA. The temperature in both of the devolatilization stages is maintained at between about 200° and 250°C. The amount of vaporized material withdrawn from the first tank is generally approximately 10 times the amount of vaporized material which is obtained from the second devolatilization stage. In all cases, the monomer content of the final polymer product exiting the bottom of the second flash tank 32 is less than 1 percent, and in most cases is less than about 0.2 percent by weight.

For further details concerning the falling strand devolatilization apparatus described above, reference is made to U.S. Pat. application Ser. No. 322,261 filed Jan. 9, 1973, the disclosure of which is hereby incorporated by reference.

Referring now to FIG. 3, there is illustrated in detail the contacting and separation apparatus 60 which is employed in accordance with the present invention to purify the styrene vapor stream which has been recovered in falling strand devolatilization apparatus 30. The apparatus assembly consists of a generally cylindrical tank 65 fabricated preferably from steel or the like. The tank 65 contains a side input pipe 66 which is adapted to receive the styrene vapor stream withdrawn from the first devolatilization tank 31 of devolatilizer 30. Tank 65 also contains at its upper end an exit pipe 67 through which the purified styrene vapor stream ultimately exits from contacting and separation device 60, as well as a second exit pipe 68 located at the bottom of the tank and serving for the withdrawal of the contacting liquid 69 circulated within the tank. A second input pipe 70 is located on the side of tank 65 near the top portion thereof and this pipe serves as an input for the contacting liquid 69. Inside of tank 65 are positioned a series of three vertically arranged sieve trays 71 arranged in the conventional staggered manner. Associated with the contacting and separation tank 60 is a contacting liquid recycle loop 63 which begins at the exit pipe 68 for the contacting liquid at the bottom end of tank 65 and continues through pump 72 back up to the inlet pipe 70 at the top of the tank where the contacting liquid is reintroduced. The recycle loop 63 also contains therein a refrigeration unit 73 in parallel with a bypass line 74, which by the selection of an appropriate three-way valve permits the selective passage of some, all or none of the contacting liquid through the refrigeration unit.

Those skilled in the art will appreciate, under certain conditions the need for an external source of styrene monomer rich liquid may be eliminated through the selective employment of the refrigeration means in the liquid recycle loop, should such a procedure provide better economics in a particular instance. It is important only that the oligomer and high boiling fraction content in the liquid phase in the contacting device be carefully controlled, as will be discussed in more detail hereinafter.

Also located in the recycle loop 63 are an input line 95 which supplies styrene monomer rich liquid from an external source, i.e., the contactor 90, to replenish the contacting liquid 69 and a purge line 64 through which oligomer- and high boiler-rich contacting liquid may be selectively withdrawn to maintain the appropriate level and composition of contacting liquid 69 within the contacting and separation unit 69. Appropriate control means 76 responsive to the level of contacting liquid in tank 65 is provided to regulate the input of styrene-rich liquid from contactor 90 and a similar temperature responsive control means 77 is provided to meter the withdrawal of contacting liquid through purge line 64.

In operation, styrene vapor containing oligomer, high boiling fractions and low boiling fractions is introduced at inlet pipe 66 and follows generally the path indicated by means of the arrows in FIG. 3, passing up through the sieve trays and the contacting liquid contained thereon and finally entering a separation region 78 above the uppermost tray, and thus only vapor is ultimately withdrawn from tank 65 through the vapor exit pipe 67.

As mentioned above, the contacting liquid in the unit 60 comprises a mixture of styrene monomer, styrene oligomers, high boiling compounds and inert hydrocarbons. The weight percentage of oligomers in such liquid is generally above the percentage of styrene oligomers in the vapor stream entering the unit; however, the partial pressure of oligomers over the liquid in the contacting zone is less than the partial pressure of oligomers in the vapor stream. The quantity of contacting liquid in the contacting zone (as well, in effect, as the degree of contacting between such liquid and the vapor stream) is such that after the vapor stream has passed therethrough in the contacting zone, the resulting vapor is substantially free of super heat. The composition of the liquid in the contact region is generally such that the proportion of oligomers and high boiling compounds in the contacting liquid is greater than in the liquid feed stream charged to the contact zone but less than the proportion required for equilibrium with the charged vapor stream. In the contacting step, most of the super heat contained in the initially charged vapor feed stream is surrendered and utilized to vaporize a fraction of the styrene monomer and miscellaneous low boiling hydrocarbons from the liquid phase. Concurrently therewith, a fraction of the oligomer content and high boiling content of the vapor feed stream is condensed into the liquid phase. Generally, the pressure within the contacting zone may range from about 1 to 200 mms. HgA. and the temperature may range from about 0° to 120°C, with the lower portion of these respective ranges being preferred to minimize coincidental styrene polymerization in the liquid phase. In some instances, it is preferable to continuously and simultaneously add a styrene polymerization inhibitor to the liquid in contacting and separation device 60 to substantially completely prevent styrene polymerization therein. The inhibitor is chosen so as to have a molecular weight great enough to keep the inhibitor out of the vapor phase and in the liquid phase, one particularly preferred suitable inhibitor being tertiary-butylcatecol. Addition rates for such an inhibitor are usually below about 0.05 weight per cent, based on the total weight of liquid.

Typically, the vapor feed stream comprises at least about 60 weight per cent styrene monomer, up to about 3 weight per cent styrene oligomers, up to about 3 weight per cent of high boiling compounds and the balance up to 100 weight per cent of any given stream being inert hydrocarbons boiling within ±10°C. of styrene at 760 mms. Hg. The pressure of the feed stream generally ranges from about 1 to about 100 mms. Hg. and the temperature typically ranges from about 175° to 300°C., and more particularly from about 250° and 280°C. Preferably, the styrene content of the charged vapor stream is at least 80 weight per cent styrene monomer. Preferably also, the vapor stream is at a pressure of from about 40 to 100 mms. HgA. and the contacting zone is also preferably at a pressure of from about 40 to 100 mms. HgA.

For example, the temperature of a particular vapor stream entering unit 60 at inlet pipe 66 is about 175°C. and the stream comprises about 952.8 lbs./hr. styrene, about 7.55 lbs./hr. dimer, about 11.44 lbs./hr. trimer and about 28.3 lbs./hr. of hydrocarbons consisting primarily of a mixture of ethylbenzene and cumene. The temperature in the unit 60 is maintained at about 70°C. and a pressure of 61 mms. HgA. The vapor stream exiting from the unit 60 through pipe 67 is at about 70°C. and comprises about 1750 lbs./hr. styrene, about 1 lb./hr. of dimers, about 1.8 lbs./hr. of trimer and about 51 lbs./hr. of low boiling hydrocarbons. The styrene monomer rich liquid added to the system through line 95 is at about 5°C. and comprises about 817 lbs./hr. of styrene monomer. The purged stream exiting from line 64 is at about 70°C. and amounts to approximately 64 lbs./hr. withdrawn.

In another run, where, for example, the entering stream of styrene monomer vapor contains approximately 0.9% stearic acid which has been added as an internal lubricant, together with approximately 3.5% concentration of oligomer, it is noted that the exiting vapor stream contains only approximately 0.4% stearic acid and 0.13% oligomer.

For further details regarding suitable contacting and separation apparatus, reference is made to U.S. Pat. application Ser. No. 172,188, now U.S. Pat. No. 3,719,720, filed Aug. 16, 1971, the disclosure of which is hereby incorporated by reference.

Referring to FIG. 4, there is illustrated in detail the second contacting device 90 employed in accordance with the present invention to recover the residual styrene monomer contained in the vapor stream exiting from the second stage of the devolatilization apparatus 30. Contactor unit 90 consists of a generally cylindrically shaped tank 96 preferably fabricated from steel and isi provided near its upper end with a vapor inlet pipe 97 to receive the aforesaid vapor stream and is provided at its bottom end with a condensate withdrawal pipe 98 through which the liquid condensate 99 within the device is removed. Near the lower end of the tank 96 on one side thereof is located an L-shaped vapor discharge conduit 100 culminating in a vent line 91. Positioned in vertically displaced relationship one above the other near the central vertical axis of the tank 96 are a plurality of spraying heads 101 which communicate by means of individual pipes 102 with a main manifold pipe 103 located outside of the tank wall. A series of identical spraying heads 101 are similarly positioned in the upstanding leg of L-shaped vapor discharge conduit 100. Each of these heads likewise communicate by means of a pipe 104 with an exterior manifold pipe 105. Each of the exteriorly located manifold pipes 103 and 105, and ultimately each of the spray heads 101, is provided with a supply of refrigerated cooling liquid by means of recycle loop 106 which emanates from the condensate withdrawal pipe 98 and contains refrigeration unit 92 between this point and the termination of said recycle loop at the spraying heads 101. Recycle loop 106 also contains a feed line 107 for supplying additional styrene monomer to the system, if necessary, in order to provide makeup styrene monomer or to assure complete dissolving of any additives which may have been entrained in the vapor stream exiting from the second stage of the volatilization apparatus 30. Also provided in the recycle loop 106 is an exit line 95 through which a portion of the recycled, refrigerated cooling liquid may be withdrawn from the recycle loop and added to the contacting liquid supply 69 in contacting and separation apparatus 60 illustrated in FIG. 3.

In operation, the vapor stream exiting from the second flash tank 32 of devolatilization apparatus 30 enters contacting tank 96 by means of input pipe 97 and is intimately, directly contacted with the refrigerated cooling liquid being discharged from spraying heads 101, this cooling liquid having been cooled to a temperature below 25°C., and preferably below 10°C., by means of refrigeration unit 92 in recycle loop 106. As a result of the intimate contact with the cooling liquid, essentially all condensable components of the input vapor stream are condensed and become part of the cooling liquid supply 99. Any residual condensables are subjected to a second intimate contact with the cooling liquid as the vapor stream passes out of tank 96 and through the L-shaped vapor exit conduit 100 by means of the additional spraying heads 101 located therein. There is then vented to the atmosphere via line 91 the non-condensables containing only a trace of styrene monomer and other low boiling hydrocarbons. The ultimate liquid condensate product 99, which is almost pure in styrene monomer and contains only minor amounts of oligomer and high boiling compounds, optionally with additional pure styrene monomer added thereto, is withdrawn from the bottom of tank 96 and is subjected to cooling in refrigeration unit 92, whereupon a portion of the recycle stream is recycled back to the spraying heads 101 and a second portion of the refrigerated recycle stream is directed to the contacting and separation unit 60 to replenish the supply of contacting liquid 69 therein, if necessary.

Thus, there has been provided an on-line technique for the recovery and purification of alkenylaromatic monomers, whereby substantially 100 percent of the monomeric material is recovered for ultimate recycle to the polymerization reactors, and wherein this recovered monomer is continuously purified to remove a large portion of undesirable alkenylaromatic oligomer and high boiling organic hydrocarbons therefrom prior to the said recycle of the recovered monomer.

While the foregoing invention has been described and pointed out with reference to certain specific and preferred embodiments thereof, it is to be understood that no limitations are to be implied from the foregoing description. The protection to be afforded this subject invention is to be limited only by the scope of the claims appended hereto.

What is claimed is:

1. An apparatus for the continuous on-line recovery of alkenylaromatic monomer from a stream containing alkenylaromatic monomer, alkenylaromatic high polymer, alkenylaromatic oligomer, high boiling organic compounds and inert hydrocarbons, and for reducing the concentration of alkenylaromatic oligomers and high boiling organic compounds in said recovered alkenylaromatic monomer, said apparatus comprising in combination A. a two-stage falling strand devolatilizing means for an alkenylaromatic polymer-monomer melt, comprising a heating means for said melt mounted integrally above first and second flash vaporization chambers positioned respectively in contiguous descending vertical relationship and communicating with one another, means for producing a different vacuum within each of said flash vaporization chambers and means for maintaining an elevated temperature in said chambers;

B. a first contacting and separation means for bringing into direct and intimate contact a vapor stream from the said first flash vaporization chamber of said volatilizing means and a liquid stream and for thereafter separating said vapor stream from said liquid stream, comprising an enclosed vessel having a plurality of perforated sieve trays carrying said liquid stream and permitting direct and intimate contact with said vapor stream passing upwardly through said perforations in said trays and the liquid stream carried thereby, and a separation zone for separating said vapor stream from said liquid stream;

C. a second contacting means for bringing into direct and intimate contact a vapor stream from said second flash vaporization chamber of the devolatilizing means and a cooled liquid stream sufficiently to condense substantially all of said vapor stream;

D. conduit means establishing communication between said first flash vaporization chamber and said first contacting and separation means; and E. conduit means establishing communication between said second flash vaporization chamber and said second contacting means.

2. The apparatus as defined by claim 1, further comprising discharge means in said second contacting means for removal of said cooled liquid stream and said condensed vapor stream and conduit means operatively connecting said discharge means with said liquid stream in the first contacting and separation means.

3. The apparatus as defined by claim 1, wherein said first contacting and separation means comprises a vessel having (1) a vapor stream inlet means near its lower end, (2) a vapor stream outlet near its upper end, (3) a liquid stream inlet means near its upper end, (4) a liquid stream outlet means near its lower end, (5) a plurality of perforated sieve trays positioned within said vessel in a manner permitting said liquid stream to successively traverse each tray in descending order as said liquid stream flows from its said inlet means to its said outlet means, said trays permitting the vapor stream to pass from its said inlet means to its said outlet means only by passing through said perforations in the trays, (6) a separation zone near its upper end for separating said vapor stream from said liquid stream, and (7) means to recirculate exteriorly of said vessel the liquid stream from its said outlet means to its said inlet means.

4. The apparatus as defined by claim 3, further comprising a refrigeration means and a bypass means in parallel therewith in said recirculating means and valve means selectively permitting complete or partial bypass of said refrigeration means.

5. The apparatus as defined by claim 1, wherein said first contacting and separating means contains three of said sieve trays.

6. The apparatus as defined by claim 1, wherein said second contacting means comprises an enclosed vessel having (1) a vapor stream inlet near its upper end, (2) a vapor stream outlet near its lower end, (3) a liquid stream outlet means near its lower end, (4) a plurality of spraying head members positioned in vertically spaced relationship within said vessel in such a manner as to assure intimate contact of a cooled liquid sprayed therefrom with said vapor stream as it passes from its said inlet means to its said outlet means, and (5) means to supply a cooled liquid to said spraying heads.

7. The apparatus as defined in claim 6, further comprising a collection means at the lower end of said vessel for collecting said cooled liquid stream and said condensed vapor stream and recycle loop means for recirculating exteriorly of said vessel at least a portion of said cooled liquid stream and condensed vapor stream collected by said means, said recycle loop means containing refrigeration means therein.

8. The apparatus as defined in claim 6, wherein said vapor stream outlet means comprises an L-shaped conduit member containing in its upstanding leg portion at least one spraying head member for said cooled liquid stream and means to supply a cooled liquid to said cooled spraying heads.

* * * * *